United States Patent [19]
Ota et al.

[11] Patent Number: 5,811,053
[45] Date of Patent: Sep. 22, 1998

[54] METHOD FOR MOLDING A LAMINATED ASSEMBLY

[75] Inventors: Tetsuyuki Ota; Masahiko Hara, both of Kanagawa-ken, Japan

[73] Assignee: Kasai Kogyo Co., Ltd., Japan

[21] Appl. No.: 927,686

[22] Filed: Sep. 11, 1997

Related U.S. Application Data

[63] Continuation of Ser. No. 614,073, Mar. 12, 1996, abandoned.

[30] Foreign Application Priority Data

Mar. 15, 1995 [JP] Japan .................................... 7-056305

[51] Int. Cl.$^6$ ............................ B29C 33/18; B29C 45/14
[52] U.S. Cl. ........................ 264/511; 264/254; 264/266; 264/274
[58] Field of Search ................................. 264/250, 254, 264/266, 275, 277, 511, 513, 274, 294, 296

[56] References Cited

U.S. PATENT DOCUMENTS

| | | |
|---|---|---|
| 4,779,390 | 10/1988 | Repper et al. . |
| 4,898,706 | 2/1990 | Yabe et al. ............................... 264/266 |
| 4,923,539 | 5/1990 | Spengler et al. ........................ 264/511 |
| 4,968,474 | 11/1990 | Ito et al. .................................. 264/266 |
| 5,009,821 | 4/1991 | Weaver .................................... 264/266 |
| 5,091,031 | 2/1992 | Strapazzini ............................... 264/511 |
| 5,133,912 | 7/1992 | Hagiwara et al. ....................... 264/277 |
| 5,298,215 | 3/1994 | Krause ..................................... 264/266 |
| 5,395,580 | 3/1995 | Morita et al. ............................ 264/266 |
| 5,395,668 | 3/1995 | Ito et al. . |
| 5,401,457 | 3/1995 | Valyi ........................................ 264/266 |
| 5,525,283 | 6/1996 | Nicolay .................................... 264/266 |
| 5,529,742 | 6/1996 | Strapazzini .............................. 264/511 |
| 5,571,355 | 11/1996 | Kornylo ................................... 264/511 |

FOREIGN PATENT DOCUMENTS

| | | |
|---|---|---|
| 045421 | 2/1982 | European Pat. Off. . |
| 343245 | 11/1989 | European Pat. Off. . |
| 451447 | 10/1991 | European Pat. Off. . |
| 546660 | 6/1993 | European Pat. Off. . |
| 549809 | 7/1993 | European Pat. Off. . |
| 62-256619 | 11/1987 | Japan . |
| 07195430 | 8/1995 | Japan . |
| 2271956 | 5/1994 | United Kingdom . |

*Primary Examiner*—Angela Ortiz
*Attorney, Agent, or Firm*—Dickstein Shapiro Morin & Oshinsky LLP

[57] ABSTRACT

In a method for molding a laminated assembly comprising a resin core member, and a surface skin member either partly or entirely placed over the surface of the resin core member, the dimensional precision of a part of the surface skin member involving a high rate of extension is improved, and the cushioning property and the surface quality of this part are avoided from being impaired. An approximately molded portion is defined in a part of the surface skin member involving a relatively high rate of extension during the vacuum molding process using a vacuum molding die assembly, and the thus molded surface skin member is mounted on the upper die for mold press forming with a gap defined between the approximately molded portion or an unmolded portion and the associated die surface. During the mold press forming process, the pressure of the semi-molten resin material molds the surface skin member into its final shape so that the molding precision of the part of the surface skin member involving a high rate of extension can be improved. In particular, when the surface skin member is lined with a foamed lining layer, damage to the foamed lining layer of the surface skin member during the process of mold press forming is minimized.

12 Claims, 9 Drawing Sheets

METHOD FOR MOLDING A LAMINATED ASSEMBLY

This is a continuation application Ser. No. 08/614,073 filed Mar. 2, 1996, now abandoned.

TECHNICAL FIELD

The present invention relates to a method for molding a laminated assembly which is suitable for use as automotive upholstery components such as automotive door trims. In particular, the present invention relates to a method for molding a laminated assembly which provides a high molding capability for the surface skin member even in parts involving high rates of extension, and is free from such unsatisfactory molding results as pockmarks and other undesirable appearances and an insufficient cushioning property.

BACKGROUND OF THE INVENTION

Figure 11:
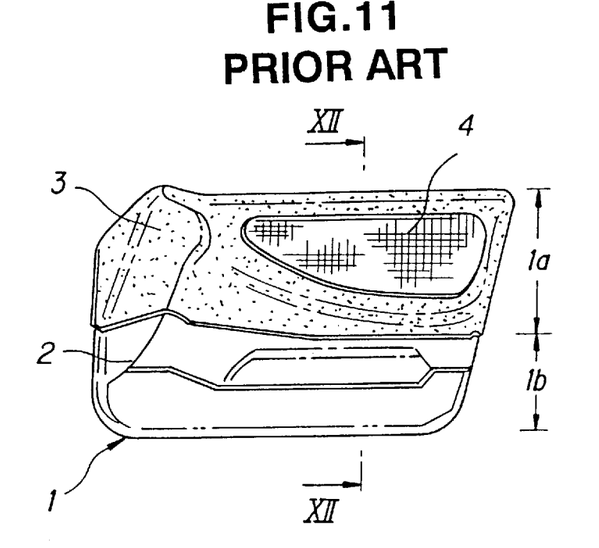
FIG. 11 is a front view showing a conventional automotive door trim.

FIG. 11 is a front view showing an automotive door trim given as an example of automotive upholstery component which consists of a two-component molded assembly having an upper portion 1a and a lower portion 1b which may consist of different synthetic resin materials but are molded simultaneously in a common die assembly. These two portions thus provide different and contrasting appearances (which may be of different colors) for ornamental purpose.

Figure 12:
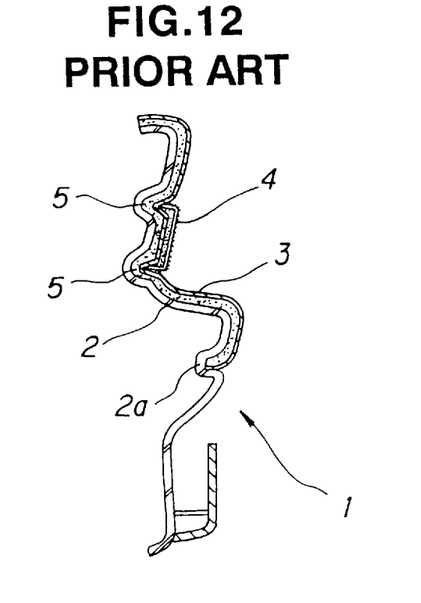
FIG. 12 is a sectional view taken along line XI—XI of FIG. 11.

Referring to FIG. 12, this assembly typically comprises a resin core member 2 which is molded into a prescribed shape and given with a shape retaining property and a sufficient mounting rigidity to be mounted on a vehicle body panel, a surface skin member 3 attached to a surface of the resin core member 2 in an upper portion 1a of the door trim 1, and a central member 4 mounted centrally on the surface skin member 3.

More specifically, a contrast is produced between the upper portion 1a of the door trim 1 covered by the surface skin member 3 and the lower portion 1b of the door trim 1 exposing the surface of the resin core member 2 for an improved ornamental effect. The contrast between the surface skin member 3 and the central member 4 further improves the ornamental effect.

A groove 2a is provided in the resin core member 2 along the boundary between the upper portion 1a and the lower portion 1b to neatly process the peripheral edge of the surface skin member 3. The peripheral portion of the surface skin member 3 is fitted into this groove 2a. Similarly, the peripheral portion of the central member 4 is neatly processed by using a groove 5 provided around the central member 4.

Figure 13:
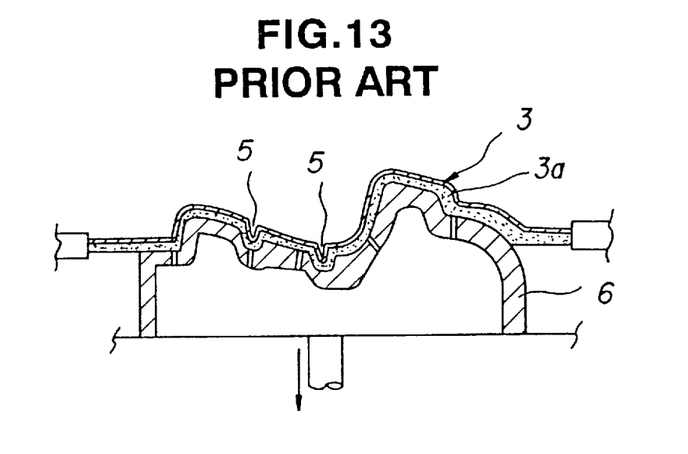
FIG. 13 is a sectional view showing the step of vacuum molding the surface skin member of the conventional automotive door trim.

Now the process of fabricating the door trim 1 is briefly described in the following. Referring to FIG. 13, the surface skin member 3 is molded into a prescribed shape by using a vacuum molding die assembly 6. Typically, to allow the groove 5 for the peripheral portion of the central member 4 to be formed and the peripheral portion of the surface skin member 3 to be favorably processed, the surface skin member 3 is integrally provided with a peripheral flange 3a that is to be fitted into the groove 2a of the resin core member 2.

Figure 14:
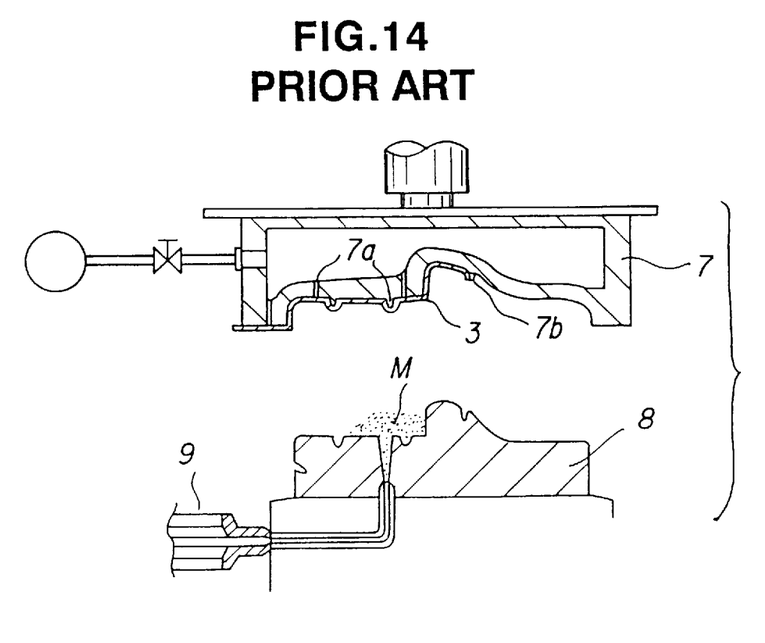
FIG. 14 is a sectional view showing the step of mold press forming the conventional automotive door trim.

After the surface skin member 3 is molded accurately to the shape of the final product, and is appropriately trimmed, as illustrated in FIG. 14, the surface skin member 3 is mounted closely onto the die surface of the upper die 7 of the mold press forming die assembly by using a vacuum suction mechanism.

The groove 5 and the peripheral flange 3a of the surface skin member 3 are closely placed against corresponding projections 7a and 7b of the upper die 7. The upper die 7 is lowered, and when a prescribed gap is defined between the upper and lower dies 7 and 8, the upper die 7 is stopped, and semi-molten resin M, which is the material for the resin core member 2, is distributed over the die surface of the lower die 8 of the mold press forming die assembly from an injection molding device 9. Then, the upper die 7 is lowered to its bottom dead point to thereby close the upper and lower dies 7 and 8 upon each other so that the resin core member 2 is molded into a prescribed shape by the mold press forming process, and, at the same time, the surface skin member 3 is integrally attached to the surface of the resin core member 2.

Although it is not shown in the drawings, the central member made of such materials as cloth is mounted on the surface of the surface skin member 3 in the upper portion 1a of the door trim 1, and the peripheral portion of the central member is fitted into the groove 5.

When the resin core member 2 and the surface skin member 3 are integrally joined by the mold press forming process in this manner, the parts of the surface skin member involving high rates of extension such as the groove 5 tend to be excessively stretched and thinned during the vacuum molding process, and the final width of the groove 5 may become greater than anticipated with the result that the peripheral portion of the central member 4 may not closely fit into the groove 5, and aesthetically undesirable results may be produced.

Because the surface skin member 3 typically consists of a laminated sheet having a cushioning property which is formed by lining a PVC sheet with a foamed lining layer such as polyethylene foam, if the groove 5 is relatively narrow, the amount of extension of the surface skin member 3 in this region becomes so great that the surface skin member may not be able to follow the contour of the die surface of the die assembly during the vacuum molding process.

Furthermore, because the cells of the parts of the foamed lining layer of the surface skin member 3 which are closely mounted over the projections or ridges 7a and 7b of the upper die tend to be extended and stretched, and the mechanical strength of the walls of the cells tend to be reduced, the walls of the cells may be scraped off by the semi-molten resin M during the mold press forming process, resulting in a poor cushioning property, surface irregularities, and pockmarks in these regions.

BRIEF SUMMARY OF THE INVENTION

In view of such problems of the prior art, and a primary object of the present invention is to provide a method for molding a laminated assembly, comprising of a resin core member and a surface skin member covering, either partly or entirely, the surface of the resin core member, which would not produce any poor cushioning property or pockmarks and other undesirable external appearances of the surface skin member even in the regions involving high rates of extension, and which can improve the dimensional precision during the process of vacuum molding the surface skin member.

A second object of the present invention is to provide a method for molding a laminated assembly which includes the steps of vacuum molding and mold press forming which can reduce the cost of the die assembly for vacuum molding.

A third object of the present invention is to provided a method for molding a laminated assembly which can improve the quality of the molded product with a minimum modification of the existing systems.

According to the present invention, these and other objects can be accomplished by providing a method for molding a laminated assembly including a resin core member molded from semi-molten resin material into a prescribed shape in a mold press forming die assembly, and a surface skin member placed over a surface of said resin core member, said surface skin member including a portion involving a high rate of extension when being placed over said surface of said resin core member, comprising the steps of: molding said surface skin member generally into a prescribed shape by using a vacuum molding die assembly, however, with said portion involving a high rate of extension being molded into an approximate shape of its final shape; mounting said surface skin member on an upper die of said mold press forming die assembly with a gap defined between said portion of said surface skin member molded into said approximate shape and an associated part of a die surface of said upper die; supplying softened resin material for said resin core member over a die surface of said lower die; and closing said upper die over said lower die to thereby mold said resin core member into said prescribed shape thereof and integrally attach said surface skin member onto said resin core member.

The material for the resin core member may be prepared, for instance, by mixing talc with a resin component such as polypropylene for the purpose of increasing the rigidity of the material, and the mixing ratio is preferably 10 weight % of the total weight, and more preferably 5 to 10 weight % of the total weight. The surface skin member preferably consists of a laminated sheet prepared by lining a top layer such as a synthetic resin sheet and a leather sheet with a foamed lining layer of such material as polyethylene foam and polyurethane foam.

Because the parts of the surface skin member involving high rates of extension (i.e.; the parts which are required to be extended more than the remaining part during the molding process) are molded only into approximate shapes involving relatively low rates of extension, and the surface skin member is mounted on the upper die for mold press forming having the die surface for the final shape of the product with a gap defined between each approximately molded portion of the surface skin member and the associated projection of the upper die, the approximately molded portions can be closely pressed onto the die surface by the pressure of the resin material during the mold press forming process, and the surface skin member can be given with a final shape with a high precision.

Because the part of the surface skin member involving a high rate of extension is provided with an increased freedom of deformation owing to the provision of the gap, the surface skin member is allowed to extend in a relatively even manner, instead of being excessively stretched locally, and the molding process can be carried out without causing any undesirable damages to the surface skin member. In particular, the surface skin member is often lined with a foamed lining layer, and such a lining layer is less prone to scraping by the heated resin material as compared to the prior art, and damage to the foamed lining layer during the molding process is reduced. Furthermore, because the part involving a high rate of extension is only approximately molded as a preliminary molding step during the vacuum molding process, instead of being molded into its final shape, a dimensional precision can be achieved during the vacuum molding process while the fabrication of the die assembly for the vacuum molding process can be simplified.

The portion of said surface skin member molded into said approximate shape may consist of a securing groove defined in said surface skin member which is adapted to receive a peripheral portion of an additional sheet member placed over said surface skin member. In this case, the additional sheet member may consist of an ornamental sheet such as a fabric or cloth sheet. Alternatively, said surface skin member may cover only a part of an entire surface of said resin core member, and said portion of said surface skin member molded into said approximate shape may consist of a peripheral flange of said surface skin member which borders a boundary between said surface skin member and an exposed part of said resin core member, and is adapted to be fitted into a securing groove provided in said resin core member.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
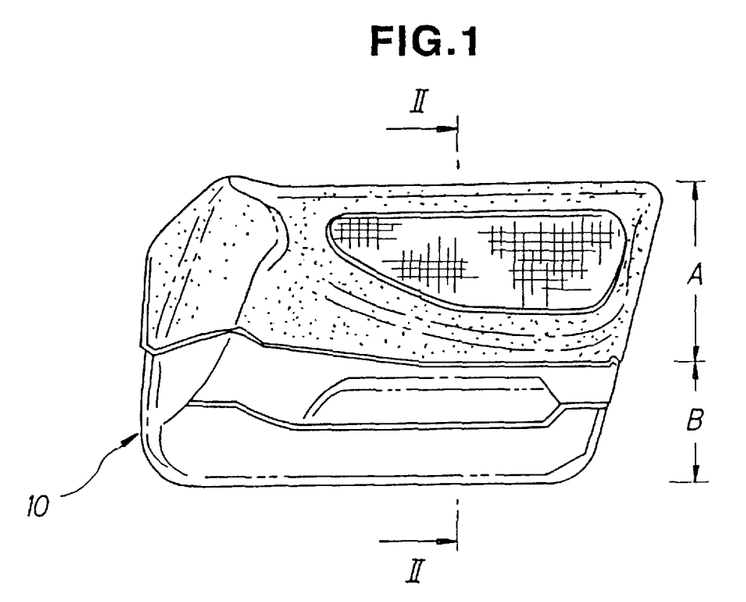
FIG. 1 is a front view showing an embodiment of the automotive door trim fabricated by the method of the present invention.
Figure 2:
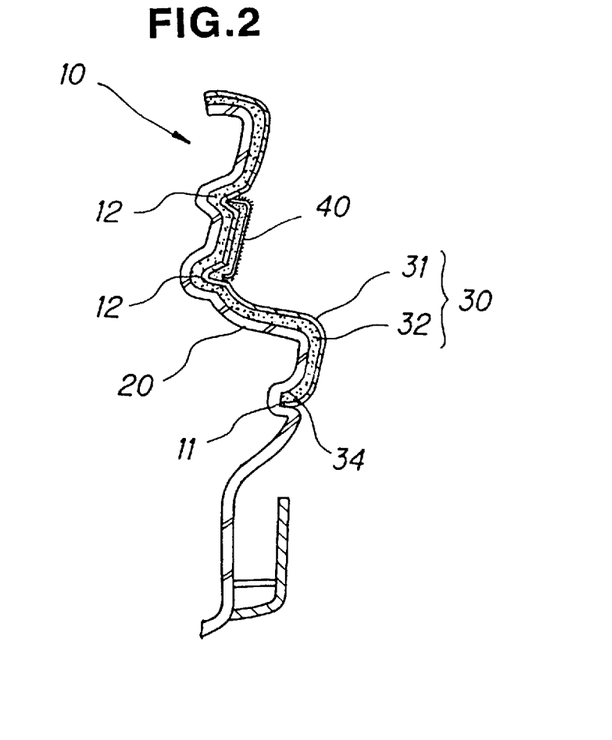
FIG. 2 is a sectional view taken along line II—II of FIG. 1.

First of all, the structure of the first embodiment of the automotive door trim made by the method of the present invention is briefly described in the following with reference to FIGS. 1 and 2. FIG. 1 is a front view of the first embodiment of the automotive door trim made by the method of the present invention, and FIG. 2 is a section view showing the structure of this automotive door trim.

The automotive door trim 10 comprises a resin core member 20 molded into a desired curved contour, a surface skin member 30 attached over a part of the surface of the resin core member 20, and an ornamental sheet 40 mounted over a central region on the surface of the surface skin member 30. The resin core member 20 is made of polypropylene resin mixed with such fillers as talc, and is molded into a complicated curved shape by the mold press forming process.

The surface skin member 30 is integrally attached to a part of the surface of the resin core member 20 during this mold press forming process.

The surface skin member 30 comprises a top layer 31 made of a PVC sheet, and a foamed lining layer 32 made of polyethylene foam. A securing groove 11 having a depth in the range of 5 to 10 mm is formed in the resin core member 20 along the lower periphery of the surface skin member 30. By fitting the lower peripheral part of the surface skin member 30 into this groove 11, the appearance of the surface skin member 30 along its periphery is improved.

The ornamental sheet 40 is preferably made of a material having a different appearance and texture from those of the surface skin member 30. In this embodiment, the ornamental sheet 40 consists of a cloth sheet lined with polyurethane foam. To improve the appearance of the ornamental sheet 40 along its periphery, a securing groove 12 is formed in the resin core member 20 and the surface skin member 30 along the periphery of the ornamental sheet 40, and the peripheral part of the ornamental sheet 40 is fitted into this groove 12.

The automotive door trim illustrated in FIGS. 1 and 2 is thus provided with a structure in which the upper portion A and the lower portion B are given with contrasting appearances because the surface of the resin core member 20 is covered by the surface skin member 30 only in the upper portion A thereof while the resin core member 20 is exposed in the lower portion B.

The automotive door trim 10 of the present invention features an aesthetically attractive appearance and a favorable cushioning property in parts thereof involving relatively high rates of extension, such as the securing grooves 11 and 12. For instance, the grooves 11 and 12 are avoided from becoming excessively wide, and thereby producing an undesirable appearance. Further, by ensuring a sufficient thickness to the foamed lining layer 32 of the parts of the surface skin member 30 near these regions, the cushioning property as well as the external appearance can be improved.

Figure 3:
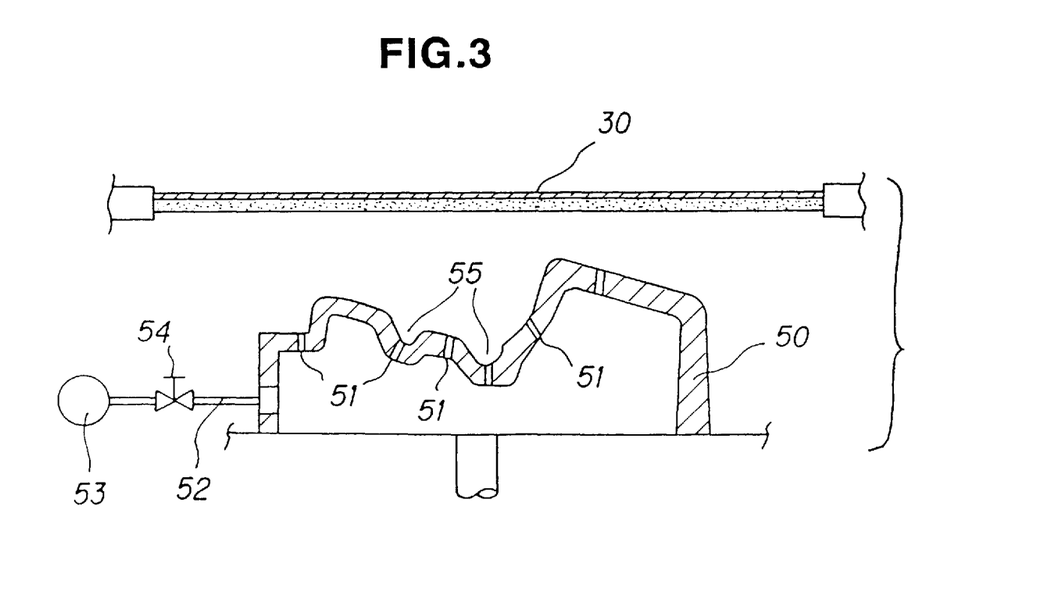
FIG. 3 is a sectional view showing the mode of mounting the surface skin member used in the automotive door trim of FIG. 1 on the die assembly for vacuum molding.
Figure 4:
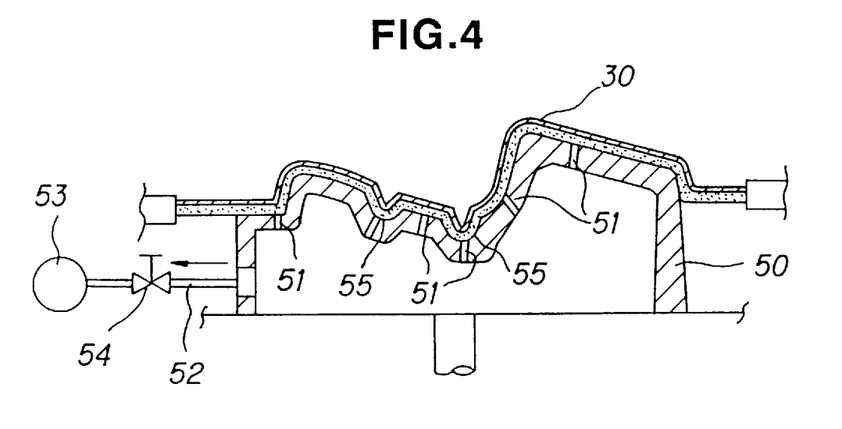
FIG. 4 is a sectional view showing the process of vacuum molding the surface skin member used in the automotive door trim of FIG. 1.
Figure 5:
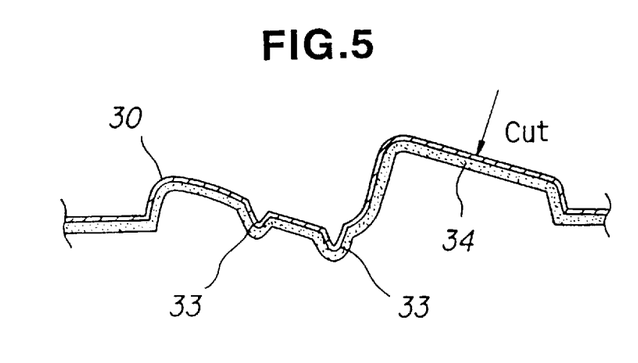
FIG. 5 is a sectional view showing the surface skin member molded by the vacuum molding process.
Figures 6, 6A, 6B:
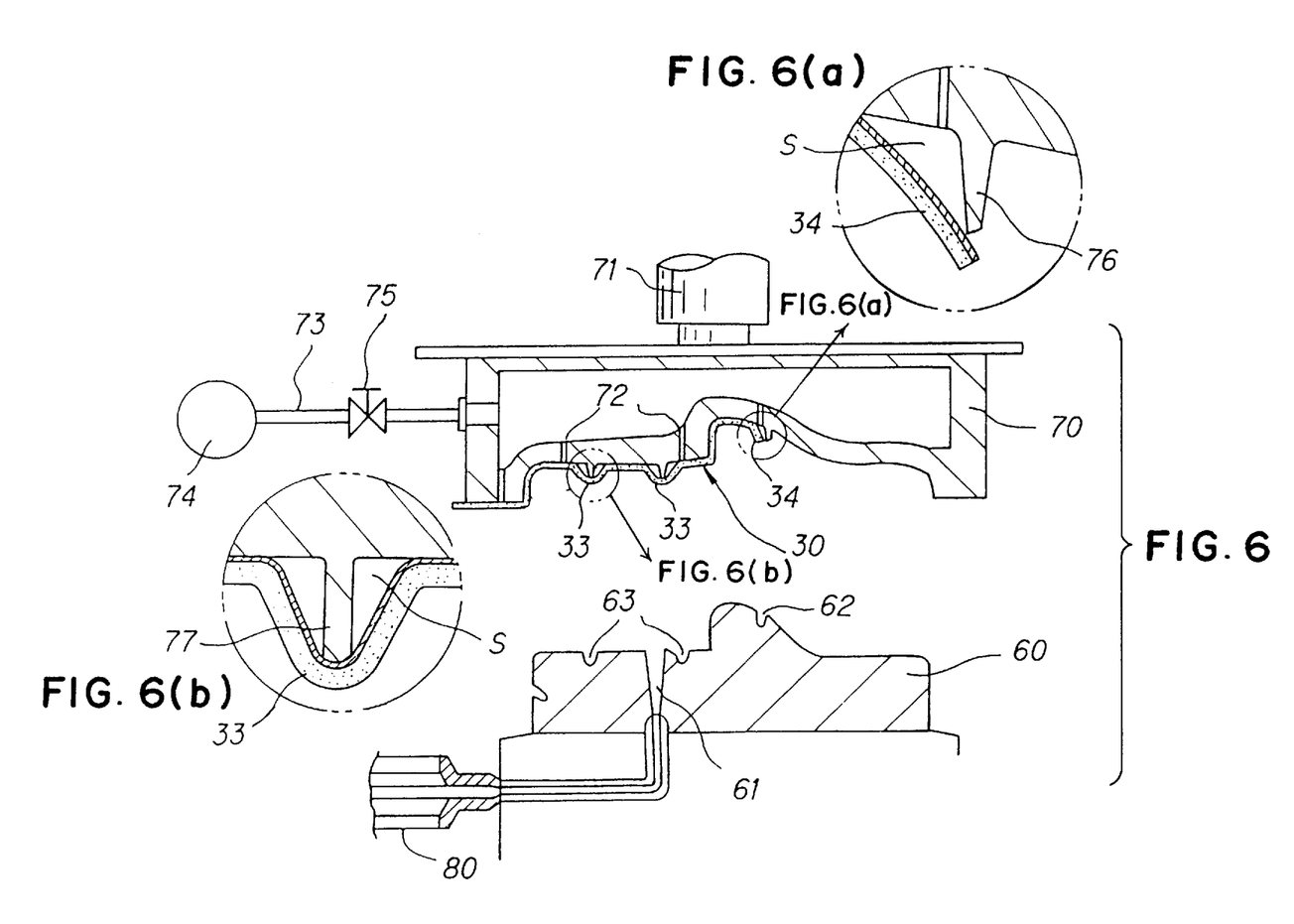
FIG. 6 is a sectional view showing the surface skin member of FIG. 5 mounted on the die assembly for mold press forming.
Figure 7:
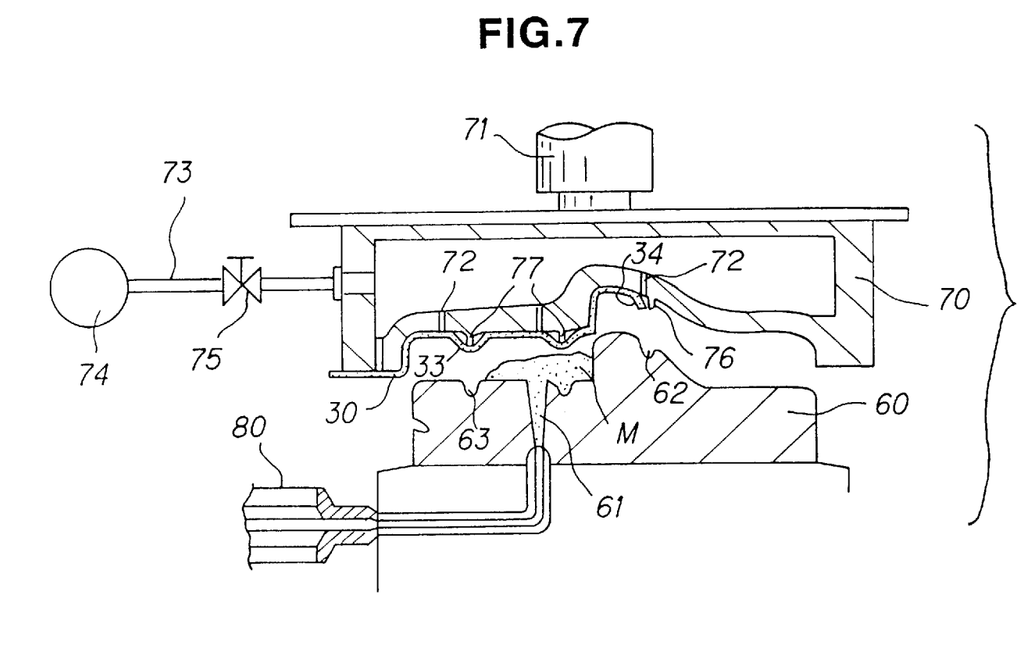
FIG. 7 is a sectional view showing the step of supplying semi-molten resin material in the method of the present invention.
Figures 8, 8A, 8B:
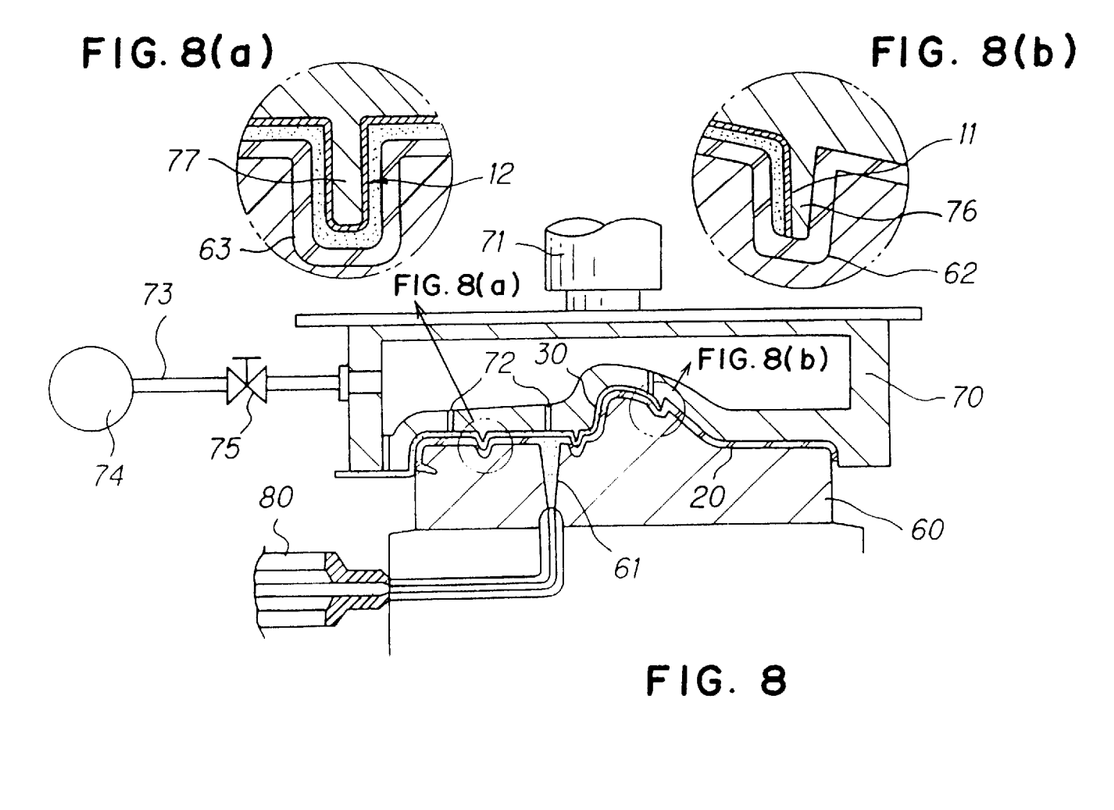
FIG. 8 is a sectional view showing the step of mold press forming in the method of the present invention.

FIGS. 3 to 8 illustrate the process of fabricating the automotive door trim 10 shown in FIGS. 1 and 2. In particular, FIGS. 3 to 5 show the steps of molding the surface skin member 30, and FIGS. 6 to 8 show the steps of integrally mold press forming the surface skin member 30 and the resin core member 20.

First of all, as shown in FIG. 3, the surface skin member 30 is softened by heating it to a prescribed temperature, and formed into a desired shape by using a vacuum molding die assembly 50. The vacuum molding die assembly 50 is provided with a plurality of vacuum suction holes 51 at prescribed locations of the die surface, and these vacuum suction holes 51 communicate with a vacuum suction pump 53, via a conduit 52 which is provided with an on-off valve 54.

The surface skin member 30 is formed approximately to the shape of the final product by this vacuum molding process, but the groove 12 for fitting the peripheral part of the ornamental sheet 40 is molded by a relatively wide recess 55 of the die assembly for vacuum molding die assembly 50 so that the groove 12 is formed into an approximate shape of the final product instead of being precisely formed into its final shape. In particular, the open end of the groove is made relatively wide so that the groove is provided with an inverted trapezoidal shape or an inverted triangle with a blunt top in cross section.

Therefore, when the surface skin member 30 is molded into the approximate shape of the final product with its approximately molded portion 33 molded by the recess 55 of the die assembly 50 for the vacuum molding process as illustrated in FIG. 4, the approximately molded portion 33 of the surface skin member 30 corresponding to the groove 12 is extended at most only by 50% of its final rate of extension as illustrated in FIG. 5. The peripheral part 34 of the surface skin member 30 that is to be fitted into the groove 11 of the resin core member 20 is still not formed into the shape of a flange.

Therefore, because the part which has to be particularly extended is only approximately molded as an approximately molded portion during the vacuum molding process for the surface skin member 30, any high dimensional precision is not required during the vacuum molding process, and the die assembly for vacuum molding can be therefore prepared without requiring any high precision work and, therefore, at a relatively low cost.

Now is described the process of integrally mold press forming the thus prepared surface skin member 30 integrally with the resin core member 20. Referring to FIG. 6, the device for mold press forming comprises a lower die 60 for mold press forming having a die surface of a desired contour, an upper die 70 for mold press forming which is located above the lower die 60 and adapted to be moved toward and away from the lower die 60, and an injection molding device 80 which is connected to the lower die 60, and is adapted to supply semi-molten resin M serving as the material for the resin core member 20. More specifically, the lower die 60 for mold press forming is provided with a gate 61 for distributing the semi-molten resin M to prescribed parts of the die surface while the upper die 70 is connected to a lifting cylinder 71 and is provided with a vacuum suction mechanism for retaining the surface skin member 30 thereon. The vacuum suction mechanism comprises vacuum suction holes 72 provided in the die surface of the upper die 70, a vacuum suction pump 74 connected to these vacuum suction holes 72 via a conduit 73, and an on-off valve 75 provided in the conduit 73.

Additionally, a ridge 76, which extends laterally across the die surface, is formed in the die surface of the upper die 70 for mold press forming and a complementary groove 62 is provided in the lower die 60 for forming the groove 11 in the resin core member 20. Similarly, an annular ridge 77 is provided in the die surface of the upper die 70 for mold press forming and a complementary groove 63 is provided in the lower die 60 for forming the groove 12 in both the resin core member 20 and the surface skin member 30.

As shown in FIG. 6 in an enlarged scale, when the surface skin member 30 is mounted on the upper die 70, the approximately molded portion 33 of the surface skin member 30 is placed over the annular ridge 77 in the manner of a tent, defining a gap S between the surface skin member 30 and the ridge 76. Similarly, with regard to the peripheral part 34 of the surface skin member 30 corresponding to the lateral ridge 76, a gap S is defined between the surface skin member 30 and the ridge 76.

With the surface skin member 30 thus placed over the upper die 70 in this loose manner, the molding process is carried out in the following manner. Referring to FIG. 7, when the upper die 70 has been lowered by the lifting cylinder 71 until a gap of 10 to 50 mm is defined between the die surfaces of the upper and lower dies 60 and 70, the upper die 70 is stopped, and the semi-molten resin M serving as the material for the resin core member 20 is distributed over the die surface of the lower die 60 via the injection molding device 80 and the gate 61. Thereafter, the upper die 70 is further lowered until the upper and lower dies 60 and 70 are closed upon each other as illustrated in FIG. 8 with the result that the resin core member 20 is molded into the prescribed shape, and, at the same time, the surface skin member 30 is integrally attached to a part of the surface of the resin core member 20.

As illustrated in FIG. 8 in an enlarge scale, the approximately molded portion 33 of the surface skin member 30 is pressed closely onto the ridge 77 of the upper die 70 under the pressure from the semi-molten resin material, and is molded into the shape of the final product or is finally formed with the groove 12.

As for the other groove 11, the peripheral part of the surface skin member 30 is molded into a flange 34 similarly under the pressure from the semi-molten resin material. Even when the resin pressure of 80 kg/cm$^2$ is applied to the surface skin member 30, the deformation of the surface skin member 30 is accommodated by the gap S, and the damage to the foamed lining layer 32 is minimized because the foamed lining layer 32 is prevented from being scraped off. Therefore, the cushioning property of the foamed lining layer 32 is not impaired.

The relationship between the peripheral part 34 of the surface skin member 30 and the ridge 76 of the upper die 70 of the present invention is compared with that of the prior art. Suppose that the top layer is 0.5 mm thick, and the foamed lining layer is 3.0 mm thick. According to the prior art, the thickness of the peripheral part 34 of the surface skin member 30 is reduced to 2.8 mm when this part is vacuum molded into the shape of a flange, and is further reduced to 1.1 mm when the surface skin member 30 is subjected to the mold press forming process because the foamed lining layer 32 is scraped off by the heated resin. On the other hand, according to the present invention, no flange is formed along the periphery of the surface skin member 30 during the vacuum molding process, and it was experimentally verified by the inventors that the thickness of the surface skin member 30, which was originally 3.5 mm, was reduced to no less than 1.5 mm when molding the flange 34, which is intended to be fitted into the groove 11, during the process of mold press forming.

With regard to the ridge 77 of the upper die 70, it is normally given with a height of 8 to 10 mm, and a thickness of 2 mm from practical design considerations in fabricating the die assembly. However, due to the resiliency of the surface skin member 30, after the process of mold press forming, the width of the groove 12 is reduced to less than 2 mm, thereby allowing the peripheral part of the ornamental sheet 40 to be neatly processed.

Figure 9:
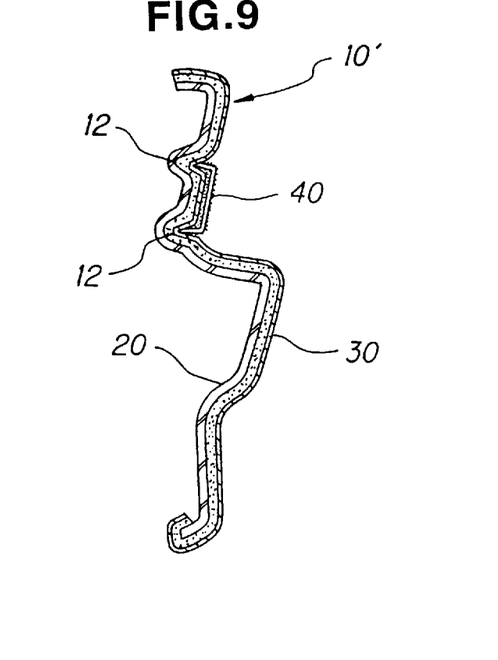
FIG. 9 is a sectional view showing another embodiment of the automotive door trim fabricated by the method of the present invention.

Thus, according to the first embodiment of the present invention, the part corresponding to the groove 12 is molded into only an approximate shape as a part involving a relatively high rate of extension, and without molding the peripheral part 34 into the shape of a flange which is intended to be fitted into the groove 12, the surface skin member 30 is mounted on the upper die 70 for mold press forming with a certain gap defined therebetween so that the approximately molded portion 33 and the peripheral portion 34 may be molded into their final shapes by the pressure of the resin during the process of mold press forming. If desired, the present invention may be applied to an automotive door trim 10' in which the surface skin member 30 is integrally mold press formed over the entire surface of the resin core member 20, and only the peripheral part of the ornamental sheet 40 is fitted into a groove 12 as illustrated in FIG. 9.

In this case, when vacuum molding the surface skin member 30, it is molded substantially to the shape of the final product with only the part thereof corresponding to the groove 12 formed as an approximately molded portion 33, and the groove 12 is molded into its final shape during the process of mold press forming in the same manner as the first embodiment.

Figure 10:
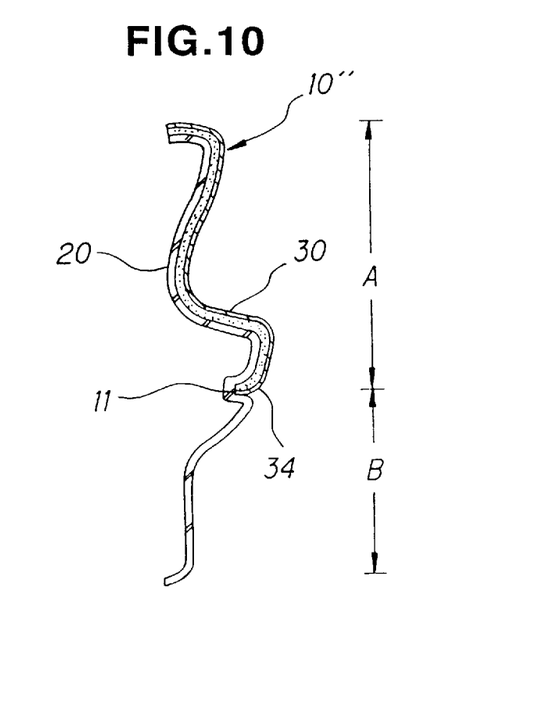
FIG. 10 is a sectional view showing yet another embodiment of the automotive door trim fabricated by the method of the present invention.

The present invention may also be applied to an automotive door trim 10" in which the ornamental sheet 40 is omitted, and the surface skin member 30 is attached only to the surface of the upper portion A of the resin core member 20 while the lower portion B consists solely of the resin core member 20 as illustrated in FIG. 10. In this case, the groove 11 of the resin core member 20 is formed during the vacuum molding process, and the peripheral portion 34 of the surface skin member 30, which is intended to be fitted into this groove 12, is formed into a flange under the pressure of the resin material during the mold press forming process.

Thus, the present invention provides a laminated assembly including a resin core member 20 and a surface skin member 30, and can be applied to a wide range of products including a molded portion involving a high rate of extension.

As described above, the method of the present invention provides the following advantages.

(1) A part involving a high rate of extension is molded into an approximate shape during the process of vacuum molding the surface skin member, and the surface skin member is mounted on the die assembly for mold press forming defining a gap between the approximately molded portion thereof and the die surface so that the pressure of the resin material provides the function to mold the approximately molded portion to its final shape during the mold press forming process. Therefore, the part of the surface skin member involving a high rate of extension can be accurately molded, and because the gap serves as a buffer against the resin pressure, damage to the foamed lining layer is minimized, and the precision in molding the part involving a high rate of extension can be improved without impairing the cushioning property of the surface skin member.

(2) A part involving a high rate of extension is molded into an approximate shape during the process of vacuum molding the surface skin member, and the surface skin member is mounted on the die assembly for mold press forming defining a gap between the approximately molded portion thereof and the die surface. Therefore, the dimensional precision during the vacuum molding process can be improved, and the fabrication of the die assembly for the vacuum molding process can be simplified.

(3) A part involving a high rate of extension is molded into an approximate shape during the process of vacuum molding the surface skin member, and the surface skin member is mounted on the die assembly for mold press forming defining a gap between the approximately molded portion thereof and the die surface. Therefore, even when there are some deviations in the dimensional precision of the surface skin member, it would not cause any difficulty in mounting the surface skin member on the die assembly, and the surface skin member can be molded to its final shape by the process of mold press forming.

The present invention thus allows any dimensional errors that may arise during the vacuum molding process to be accommodated, and the work efficiency in mounting the surface skin member on the die assembly can be improved.

What we claim is:

1. A method for molding a laminated assembly comprising the steps of:

molding a first portion of a surface skin member generally into a prescribed shape and a second portion of said surface skin member into an approximation of its final prescribed shape, by using a vacuum molding die assembly;

mounting said surface skin member on an upper die such that a gap is defined between said second portion and an associated surface of said upper die;

supplying softened resin material for a resin core member over a lower die; and closing said upper die over said lower die thereby to (1) mold said resin core member into a prescribed shape, (2) attach integrally said surface skin member to said resin core member, and (3) form said second portion into its final prescribed shape;

wherein said second portion of said surface skin member is subject to a high rate of extension when placed over a surface of said resin core member, and said portion of said surface skin member molded into said approximation of its final prescribed shape consists of a securing groove defined in said surface skin member which is adapted to receive a peripheral portion of an additional sheet member placed over said surface skin member.

2. A method for molding a laminated assembly according to claim 1, wherein said additional sheet member consists of an ornamental sheet.

3. A method for molding laminated assembly according to claim 1 wherein said surface skin member includes a foamed layer.

4. A method for molding a laminated assembly according to claim 1 wherein pressure from said softened resin material presses said second portion closely to said upper die.

5. A method for molding a laminated assembly according to claim 1 wherein a vacuum molding die assembly molds said first portion of said surface skin member into said prescribed shape and said second portion of said surface skin member into said approximation of its final prescribed shape.

6. A method for molding a laminated assembly comprising the steps of:

molding a first portion of a surface skin member generally into a prescribed shape and a second portion of said surface skin member into an approximation of its final prescribed shape, by using a vacuum molding die assembly;

mounting said surface skin member on an upper die such that a gap is defined between said second portion and an associated surface of said upper die;

supplying softened resin material for a resin core member over a lower die; and closing said upper die over said lower die thereby to (1) mold said resin core member into a prescribed shape, (2) attach integrally said surface skin member to said resin core member, and (3) form said second portion into its final prescribed shape;

wherein said surface skin member covers only a part of an entire surface of said resin core member, said second portion of said surface skin member is subjected to a high rate of extension when placed over a surface of said resin core member, and said second portion of said surface skin member molded into said approximation of its final prescribed shape consists of a peripheral flange of said surface skin member which borders a boundary between said surface skin member and an exposed part of said resin core member, and is adapted to be fitted into a securing groove provided in said resin core member.

7. A method for molding laminated assembly according to claim 6, wherein said surface skin member includes a foamed layer.

8. A method for molding a laminated assembly according to claim 6, wherein pressure from said softened resin material presses said second portion closely to said upper die.

9. A method for molding a laminated assembly comprising the steps of:

molding a first portion of a surface skin member generally into a prescribed shape and a second portion of said surface skin member into an approximation of its final prescribed shape, by using a vacuum molding die assembly;

mounting said surface skin member on an upper die such that a gap is defined between said second portion and an associated surface of said upper die;

supplying softened resin material for a resin core member over a lower die; and closing said upper die over said lower die thereby to (1) mold said resin core member into a prescribed shape, (2) attach integrally said surface skin member to said resin core member, and (3) form said second portion into its final prescribed shape;

wherein said surface skin member covers only a part of an entire surface of said resin core member, said second portion of said surface skin member is subjected to a high rate of extension when placed over a surface of said resin care member, and said second portion of said surface skin member molded into said approximation of its final prescribed shape consists of both (1) a securing groove defined in said surface skin member which is adapted to receive a peripheral portion of an additional sheet member placed over said surface skin member, and (2) a peripheral flange of said surface skin member which borders a boundary between said surface skin member and an exposed part of said resin core member, and is adapted to be fitted into a securing groove provided in said resin core member.

10. A method for molding a laminated assembly according to claim 9, wherein said additional sheet member consists of an ornamental sheet.

11. A method for molding laminated assembly according to claim 9 wherein said surface skin member includes a foamed layer.

12. A method for molding a laminated assembly according to claim 9, wherein pressure from said softened resin material presses said second portion closely to said upper die.

* * * * *